United States Patent
Trum

(10) Patent No.: US 8,589,063 B2
(45) Date of Patent: Nov. 19, 2013

(54) NAVIGATION DEVICE AND METHOD FOR DETERMINING ROAD-SURFACE FEATURES

(75) Inventor: Jeroen Trum, Eindhoven (NL)

(73) Assignee: TomTom International B.V., Amsterdam (NL)

(*) Notice: Subject to any disclaimer, the term of this patent is extended or adjusted under 35 U.S.C. 154(b) by 370 days.

(21) Appl. No.: 12/736,707

(22) PCT Filed: Jun. 24, 2009

(86) PCT No.: PCT/EP2009/057876
§ 371 (c)(1),
(2), (4) Date: Nov. 23, 2010

(87) PCT Pub. No.: WO2009/156424
PCT Pub. Date: Dec. 30, 2009

(65) Prior Publication Data
US 2011/0112764 A1    May 12, 2011

Related U.S. Application Data

(60) Provisional application No. 61/129,413, filed on Jun. 25, 2008.

(51) Int. Cl.
*G01C 21/00* (2006.01)
(52) U.S. Cl.
USPC .......................................... 701/400; 701/461
(58) Field of Classification Search
USPC .................................. 701/400, 461
See application file for complete search history.

(56) References Cited

U.S. PATENT DOCUMENTS

| | | | |
|---|---|---|---|
| 5,600,061 A | 2/1997 | Yabushita et al. | |
| 8,005,615 B2* | 8/2011 | Okabe | 701/301 |
| 2004/0206570 A1* | 10/2004 | Tajima et al. | 180/402 |
| 2005/0065711 A1 | 3/2005 | Dahlgren et al. | |
| 2007/0100532 A1 | 5/2007 | Miyajima et al. | |
| 2008/0033621 A1* | 2/2008 | Nakamura et al. | 701/65 |
| 2008/0109140 A1* | 5/2008 | Hozumi et al. | 701/49 |
| 2008/0109166 A1* | 5/2008 | Takaoka et al. | 701/216 |
| 2009/0009305 A1* | 1/2009 | Kataoka et al. | 340/435 |
| 2009/0084173 A1* | 4/2009 | Gudat et al. | 73/146 |
| 2009/0271113 A1* | 10/2009 | Chang et al. | 701/214 |
| 2010/0030435 A1* | 2/2010 | Hattori et al. | 701/49 |

FOREIGN PATENT DOCUMENTS

| | | |
|---|---|---|
| CN | 101196406 | 6/2008 |
| DE | 10 2006 022 080 | 11/2007 |
| EP | 1 780 089 | 5/2007 |
| JP | 2001-004382 | 1/2001 |
| JP | 2006-242901 | 9/2006 |

OTHER PUBLICATIONS

International Preliminary Report on Patentability dated Jan. 5, 2011.

* cited by examiner

*Primary Examiner* — Hussein A. Elchanti

(57) ABSTRACT

A navigation device includes a processor, a memory accessible by the processor, and a device to determine at least one physical parameter applied to the navigation device and to output information indicative of the at least one parameter to the processor. In at least one embodiment, the processor is arranged to determine a road-surface feature based upon the received information and to store road-surface quality information in the memory indicating the location of the road-surface feature.

10 Claims, 8 Drawing Sheets

FIG. 7(a)
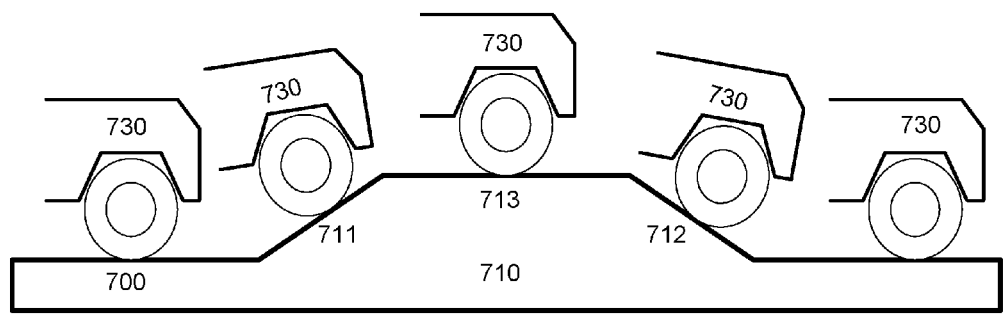
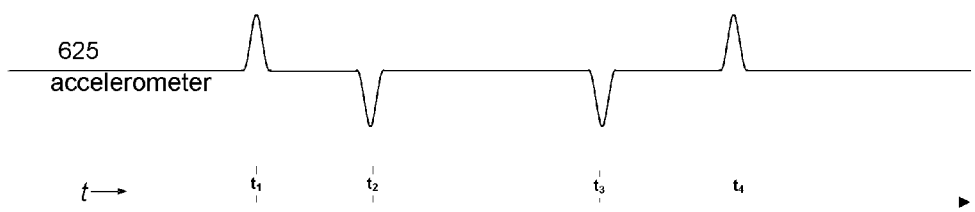
FIG. 7(b)
| | Feature Type (810) | Location (820) |
|---|---|---|
| 830 | SB | $X_1, Y_1$ |
| 840 | SB | $X_2, Y_2$ |
| 850 | SB | $X_3, Y_3$ |
| 860 | US | $X_4, Y_4$ |
| 870 | H | $X_5, Y_5$ |
800
FIG. 8

NAVIGATION DEVICE AND METHOD FOR DETERMINING ROAD-SURFACE FEATURES

This is a National Phase of PCT Patent Application No. PCT/EP2009/057876, filed on Jun. 24, 2009, which claims priority under 35 U.S.C. §365(c) and 119(e) to U.S. Provisional Application No. 61/129,413, filed on Jun. 25, 2008, the contents of each of which are hereby incorporated herein by reference in their entirety.

FIELD OF THE INVENTION

This invention relates to navigation devices and to methods for determining data by navigation devices. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

When planning a route, PNDs take into account either an expected average speed of roads, usually obtained from the map data, and/or historical information about road speeds to determine the route. In this way, particularly with the use of historical information about road speeds, a route determination process takes into account information about road surface quality since this has an impact on, and leads to a consequential reduction in, a historical speed for a road with a relatively low quality surface. For example, a road may have a low quality road surface due to the presence of one or more of holes in the road surface, often known as "pot-holes", bumps or undulations in the road surface and/or traffic calming measures installed in the road surface, all of which reduce the speed at which a vehicle may safely travel the road. Whilst the route determination process therefore implicitly takes into account road surface quality and its impact on average speed for a road, it is desired to allow an improvement of the route planning process by allowing road surface quality to be taken into account. For example, for some cars, such as sports-cars with limited suspension travel or hard suspension, a user may wish to plan a route which only follows roads having a relatively good quality road surface, thereby avoiding, as far as possible, roads having pot-holes, bumps and road-surface traffic calming measures.

It is an aim of the present invention to allow an improvement in route determination by taking into account road-surface quality information, particularly by automatically collecting road-surface quality information.

SUMMARY OF THE INVENTION

In pursuit of this aim, a presently preferred embodiment of the present invention provides a navigation device comprising a navigation device comprising a processor; a memory accessible by the processor; means to determine at least one physical parameter applied to the navigation device and to output information indicative of the at least one parameter to the processor; wherein the processor is arranged to determine a road-surface feature based upon the received information and to store information indicative of a location of the road-surface feature an in the memory.

Another embodiment of the present invention relates to a method of a method of determining road-surface feature information, comprising the steps of: receiving information indicative of one or more physical parameters of a navigation device; determining a road-surface feature based upon the received information; and storing in a memory information indicative of a geographical location of the road-surface feature.

Yet another embodiment of the present invention relates to computer software comprising one or more software modules operable, when executed in an execution environment, to cause a processor to perform a method of determining road-surface feature information, comprising the steps of: receiving information indicative of one or more physical parameters of a navigation device; determining a road-surface feature based upon the received information; and storing in a memory information indicative of a geographical location of the road-surface feature.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 7 is an illustration showing a vehicle traversing a speed bump and an output of an accelerometer of the navigation device mounted inside the vehicle;

FIG. 8 is an illustration of road-surface quality data according to an embodiment of the invention;

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
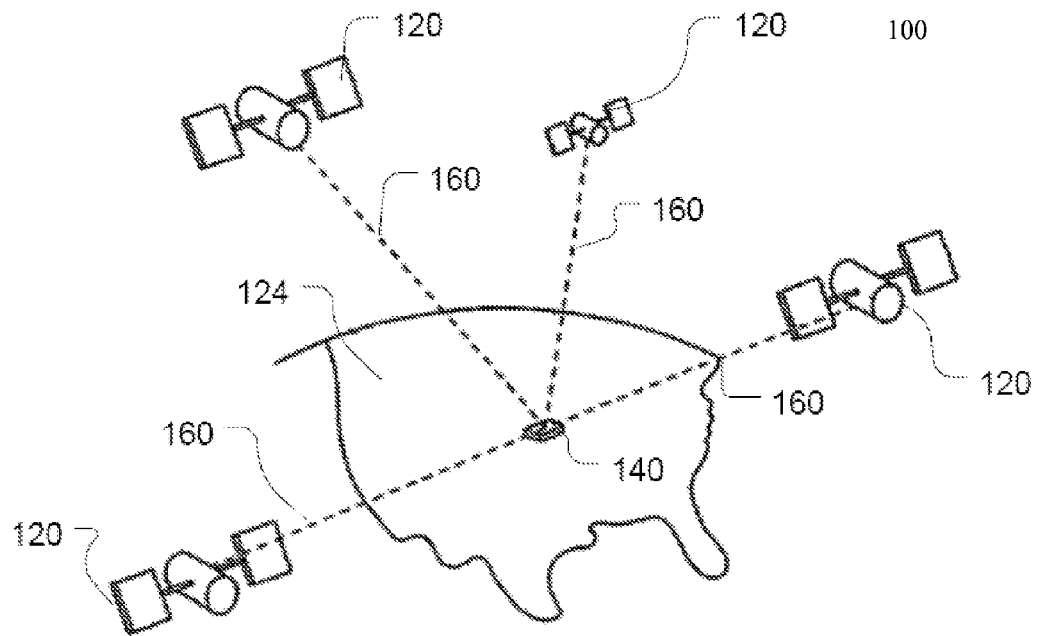
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
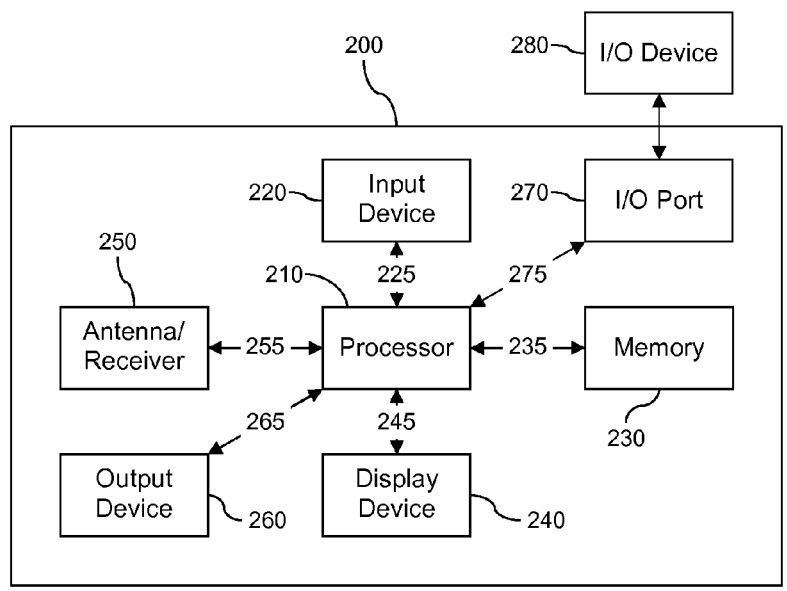
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
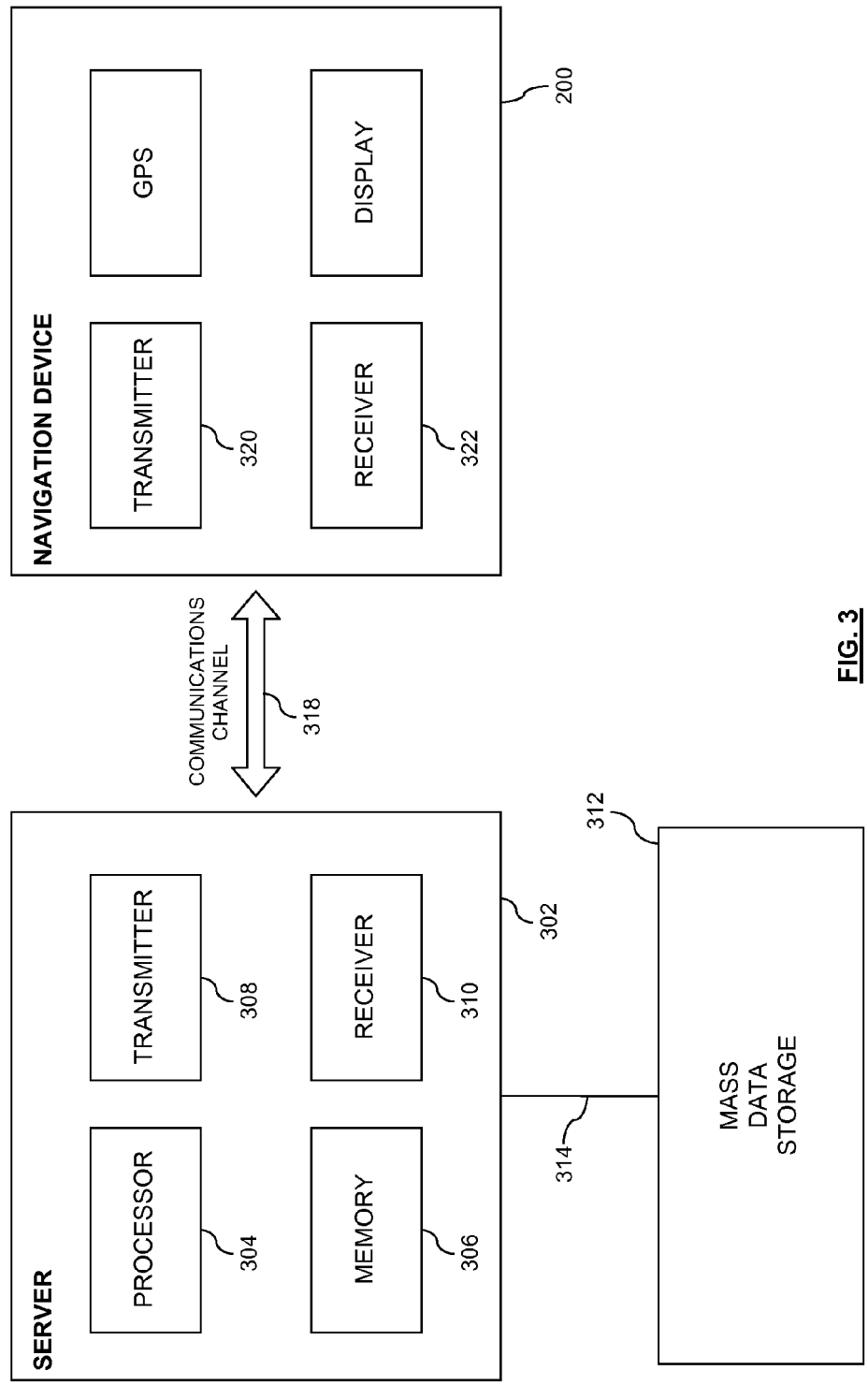
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display-screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
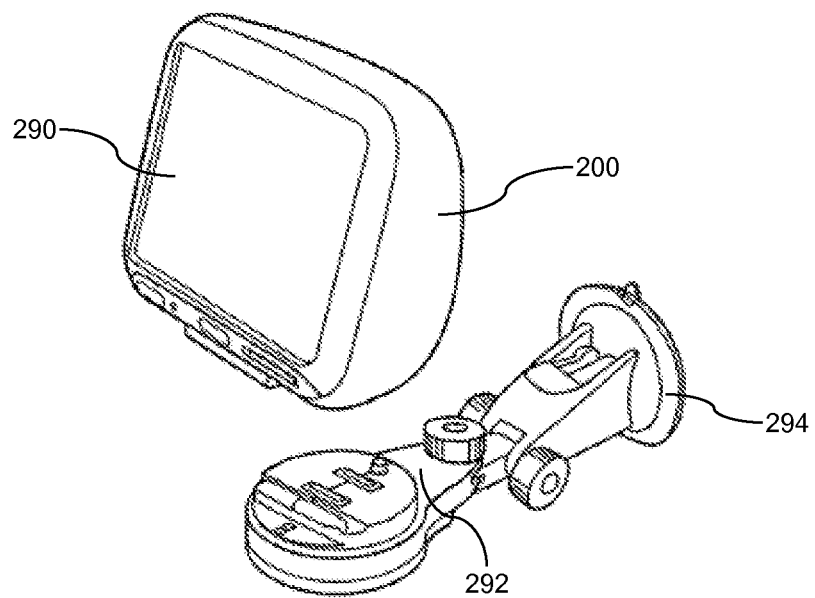
FIGS. 4A and 4B are illustrative perspective views of a navigation device.
Figure 4B:
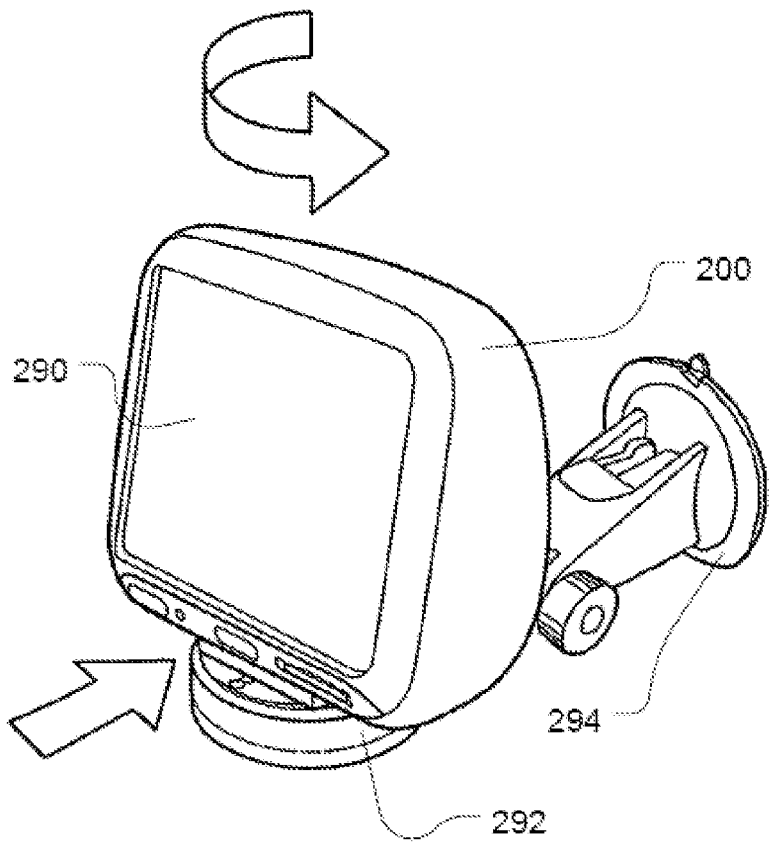

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
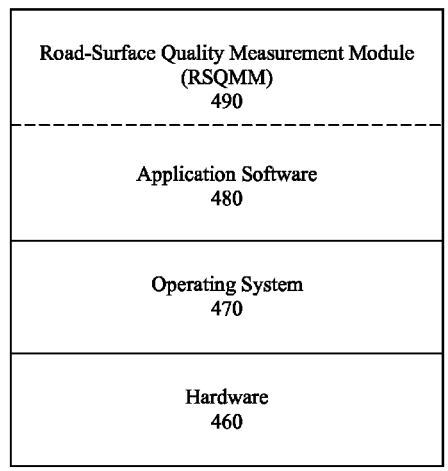
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. In accordance with the preferred embodiment of the present invention, part of this functionality comprises a road-surface quality measurement module (RSQMM) 490, the function of which will now be described in detail in connection with the following figures.

The RSQMM 490 operatively determines and records information indicative of road-surface quality of routes traveled by the navigation device 200. The RSQMM 490 determines the road surface quality information from movement, and also in some embodiments information related to the orientation, of the navigation device 200 whilst travelling along or traversing a road. In particular, the RSQMM 490 determines the road-surface quality information from vehicle-induced movement of the navigation device 200. The road-surface quality information may be stored in a store accessible by the navigation device 200, either alone or combined with the map data, so that route planning may take into account the road surface quality information, for example to exclude roads having a relatively low-quality surface. Furthermore, road surface quality information may be shared amongst a plurality of navigation devices by dissemination through the server 302. Advantageously, by having the navigation device 200 store road surface quality information, which may be shared with or distributed to other users, a need to measure road surface quality during a mapping process e.g. using a road mapping vehicle is reduced. Thus road surface quality information may be collected at lower cost and more quickly.

A preferred embodiment of a navigation device 200 including the RSQMM 490 will now be explained with reference to FIG. 6. The preferred embodiment is explained with reference to a speed bump which is a form of vertically-displaced traffic calming measure installed in or on a road surface. A speed bump or hump is a measure intended to reduce a speed of vehicles crossing the bump by causing a vertical displacement of the vehicle. Speed bumps typically have a height of between 70 and 100 mm, although it will be realised that other height speed bumps may be encountered. Speed bumps are typically formed by tarmac, asphalt or rubber, although other materials may be used. Furthermore, some vertical displacement inducing traffic calming measures are known as speed tables, which are effectively speed bumps including a central plateau of generally uniform elevation. These will also be referred to herein as a speed bump. Whilst embodiments of the present invention are explained with reference to a speed bump it will be realised that road-surface quality information will also be stored indicating the presence of other features of a road surface which cause vertical displacement. Such features may include holes or pot-holes, bumps or undulations unintentionally formed in the road surface, and other intentionally formed undulations, such as rumble strips.

Figure 6:
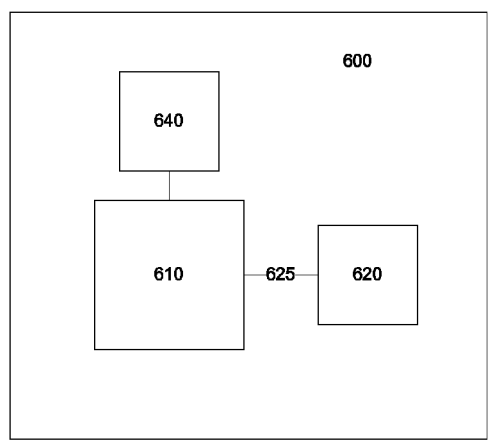
FIG. 6 is a schematic illustration of a navigation device according to an embodiment of the invention.

FIG. 6 illustrates a navigation device 600 according to an embodiment of the invention. The navigation device 600 comprises a CPU 610, an accelerometer 620 and a memory 640. The CPU 610 is arranged to receive an acceleration signal 625 output by, and indicative of, acceleration applied to the accelerometer 620. The accelerometer 620 is arranged to measure vertical acceleration of the navigation device 600. It will be realised that that navigation device 600 additionally comprises other systems and components, as previously described, however further discussion of these at this point is omitted for clarity.

The operation of the navigation device 600 will now be explained with reference to FIG. 7 which illustrates a cross-section of a road 700 having a speed bump 710 installed thereon. Whilst the operation of the navigation device 600 is described with reference to the speed bump 710, it will be realised that the navigation device operates in a similar manner in response to other vertically-displacing road surface features, either intentionally or unintentionally formed.

As noted above, the speed bump 710 is a vertically-displaced portion of the road 700. The speed bump 710 illustrated in FIG. 7(a) comprises a first inclined portion 711, a second inclined portion 712 and a generally horizontal portion 713 interposing the inclined portions 711, 712 wherein horizontal portion 713 is vertically displaced from the road surface 700. Thus, when a vehicle 730 drives across the speed bump 710 the vehicle 730 experiences an upward acceleration as the vehicle 730 contacts either the first or second 711, 713 inclined portion depending on its direction of travel. As the vehicle 730 traverses from either the first or second inclined portion 711, 712 to the horizontal portion 713 a downward acceleration will be experienced. In a situation in which the speed bump 710 has a different cross-section, such as a rounded profile, upward and downward accelerations are experienced with correspondingly different magnitudes dependent on the size of the speed bump 710. FIG. 7 illustrates five successive positions of the vehicle 730 driving along the road 700 and over the speed bump 710. FIG. 7(b) illustrates an output of the accelerometer 620 of which the acceleration signal 625 is indicative. The output of the accelerometer 620 indicates an upward acceleration at time $t_1$ and a downward acceleration at time $t_2$ as described above. Similarly, as the vehicle travels between the horizontal portion 713 and one of the first or second inclined portions 711, 712, downward and upward accelerations are determined at times $t_3$ and $t_4$ respectively.

Based upon the acceleration signal 625, the RSQMM 490 executing on the processor 610 determines that the vehicle 730 in which the navigation device 600 is being carried has driven across the speed bump 710. The presence of the speed bump 710 may be determined by detection of a pair of opposed accelerations such as those at $t_1$ and $t_2$ shown in FIG. 7. The detection of the speed bump 710 by the RSQMM 490 may also consider a relative magnitude of the pair of accelerations to determine the presence of the speed bump 710 such that the pair of accelerations have an approximately equal magnitude. Once the RSQMM 490 has determined that the vehicle 730 has driven across the speed bump 710, the RSQMM 490 is arranged to store in the memory 640 information indicative of the existence of the speed bump 710 and its geographical location.

FIG. 8 illustrates an example of a road surface quality information table 800 which is stored in the memory 640 by an embodiment of the RSQMM 490. The table 800 stores type information 810 indicative of a type of each road surface feature detected by the navigation device 600 and location information 820 indicating a location of each respective road surface feature. The table 800 illustrated in FIG. 8 comprises information indicative of three road surface features 830, 840, 850 of a type SB indicative of a speed bump whilst the location information 820 indicates a location of each of the speed bumps in a predetermined coordinate system, such as longitude and latitude.

Figure 9A:
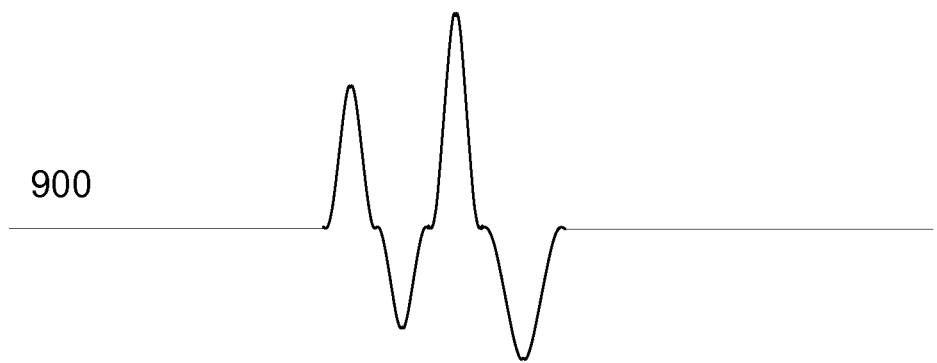
FIG. 9 is an illustration of two outputs of the accelerometer.
Figure 9B:
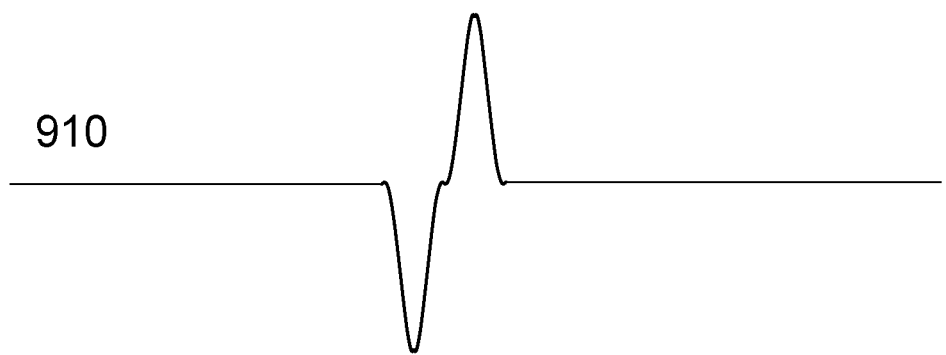

Whilst the RSQMM 490 has been described operatively determining the presence of a speed bump 710, the RSQMM 490 may, in some embodiments, also detect the presence of other road surface features. For example, the RSQMM 490 may be arranged to detect a section of uneven or roughly surfaced road based upon the acceleration signal 625. For example, as shown in FIG. 9, an acceleration signal 900, indicative of a badly surfaced section of road may comprise a plurality of acceleration measurements which together indicate that the vehicle 730 is experiencing frequent upwards and downwards accelerations, as would be expected on a rough or bumpy road. The RSQMM 490 may also determine the existence of a hole in a road surface from an acceleration signal of the type shown in FIG. 9(b) which comprises a first acceleration in a downward direction and a second upward acceleration.

Referring again to FIG. 8, a fourth road surface feature 860 of type US is included in table 800. The feature 860 of type US indicates an uneven road surface at location $X_4, Y_4$ in the coordinate system. Similarly, a fifth road surface feature 870 comprises of type H indicates a hole in the road at a location $X_5, Y_5$.

In some embodiments of the invention, he RSQMM 490 is arranged to further determine a width or length of the road surface feature based upon the acceleration signal 625 and speed information indicating a speed of the vehicle at a location of the road surface feature. For example, as shown in FIG. 7, the initial acceleration is experienced by the navigation device 600 at time $t_1$ and the final acceleration is experienced at time $t_4$. thus, the RSQMM 490 may determine a temporal duration of the speed bump 710 by:

$$t_D = t_4 - t_1$$

Using the speed information, an average speed of the vehicle between times $t_1$ and $t_4$ may be determined by the RSQMM 490.

A length (perceived by a driver of the vehicle) of the road surface feature may then be calculated by the RSQMM 490 using the formula:

$$D = S \times t_D$$

wherein S is a speed or an average speed of the vehicle over the road surface feature.

The table 800 shown in FIG. 8 may additionally store the width information of each road surface feature. Similarly, the RSQMM 490 may determine information indicative of a steepness i.e. gradient and/or height of the speed bump from the speed information and the acceleration signal 625.

In one embodiment, in order to improve a quality of the road surface feature detection, the RSQMM 490 may determine whether the navigation device 600 is mounted in or on a vehicle. Such determination may, in one embodiment, be made by receiving a signal from a sensor, such as a switch, indicating that the navigation device 600 is mounted on a cradle or other support. Determining that the navigation device 600 is mounted on a cradle or mount likely indicates that the navigation device 600 is generally upright in a vehicle. By only storing road-surface road surface quality information 800 when the navigation device 600 is mounted in a cradle may prevent inaccurate road surface quality information being determined, for example when the navigation device 600 is being carried by hand.

A further embodiment of the invention will now be described with reference to FIG. 10 which illustrates a navigation device 1000. The navigation device 1000 comprises a CPU 1010 and an accelerometer 1020 which outputs an acceleration signal 1025 as in the embodiment described with reference to FIG. 6. The navigation device 1000 further comprises a gyroscope 1030 arranged to determine an orientation of the navigation device 1000. The CPU 1010 is arranged to receive orientation information 1035 from the gyroscope 1030 indicative of the orientation of the navigation device 1000.

Figure 11:
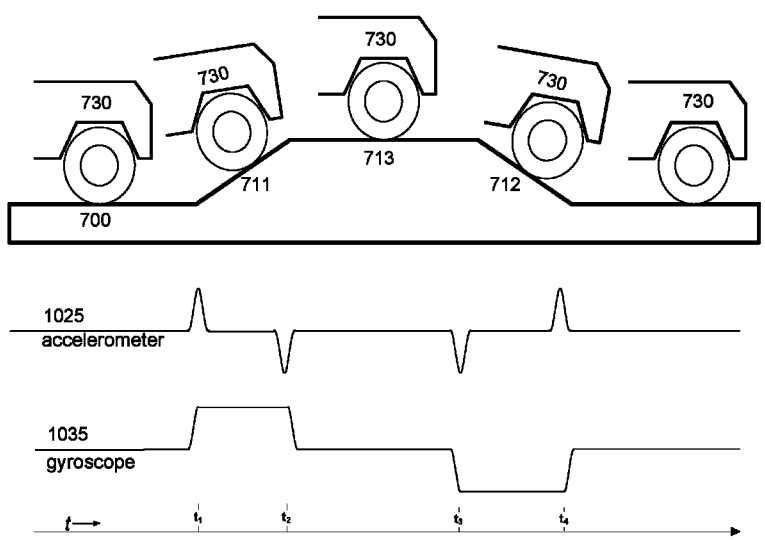
FIG. 11 is an illustration showing a vehicle traversing a speed bump and outputs of an accelerometer and a gyroscope of the navigation device mounted inside the vehicle.

The operation of the navigation device 1000 will now be described with reference to FIG. 11 which shows the speed bump 710, vehicle 730 and acceleration information 1025 previously described with reference to FIG. 7. FIG. 11 further illustrates an integrated value of the output of the gyroscope 1030 of which the orientation information 1035 is indicative. It will be noted that, in some embodiments, the gyroscope 1030 may output a non-integrated value representative of rotational acceleration. As shown in FIG. 11, at a time $t_1$ a front wheel of the vehicle 730 contacts the inclined surface 711 of the speed bump 710 which causes the vehicle 730 to incline, as shown in FIG. 11, and the orientation information 1035 indicative of the output 1100 of the gyroscope 1030 changes accordingly. Once the vehicle 730 reaches a level orientation on the speed bump 710, the output 1035 or the gyroscope 1030 correspondingly indicates that the gyroscope 1030 is substantially vertical. Once the vehicle 730 declines on the second inclined surface 713 of the speed bump 710, the output 1035 of the gyroscope 1030 indicates that the gyroscope 1030 and navigation device 1000 are declined. The RSQMM 490 is arranged to receive the acceleration 1025 and orientation signals 1035 and to determine when the vehicle 730 drives over road surface features, such as the speed bump 710. For example, the RSQMM 490 may determine the presence of the speed bump 710 based on a pair of opposed orientation measurements, as shown in FIG. 11. The acceleration information 1025 may also be used in the process. Once the presence of the speed bump 710 has been determined, the RSQMM 490 is arranged to store road surface quality information in the memory as in FIG. 8.

Figure 12:
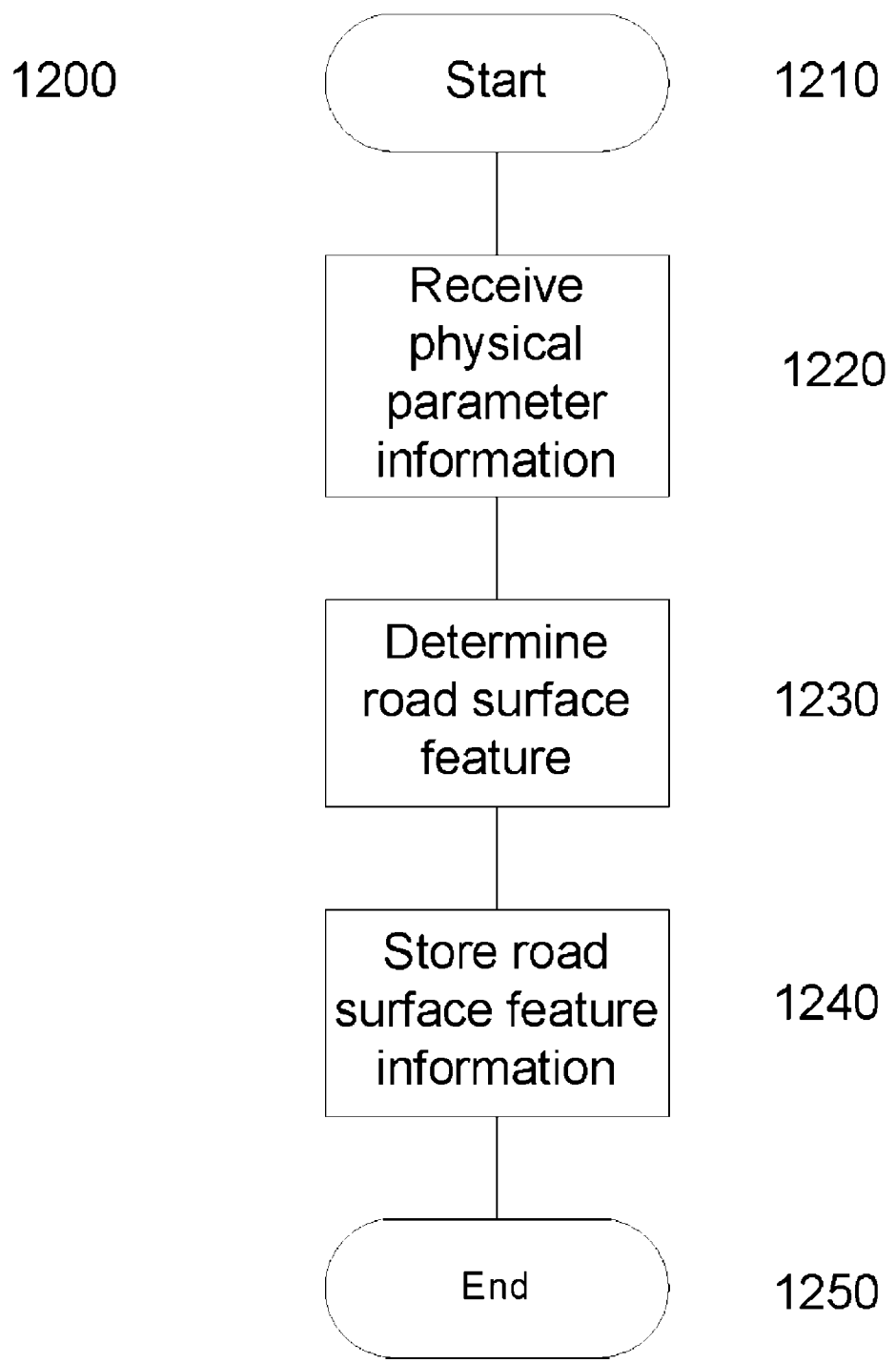
FIG. 12 is an illustration of a method according to an embodiment of the invention.

FIG. 12 shows an illustration of a method 1200 according to an embodiment of the invention. The method begins in step 1210. In step 1220 the RSQMM 490 receives information indicative of a physical parameter of the navigation device 600, 1000. In one embodiment, the RSQMM 490 receives information indicative of the acceleration of the navigation device 600, 1000. In another embodiment, the RSQMM 490 receives information indicative of an orientation of the navigation device 1000. In a further embodiment the RSQMM 490 receives information indicative of both the acceleration and orientation of the navigation device 1000.

In step 1230 the RSQMM 490 determines the presence of road surface features from the received physical parameter information. The RSQMM 490 may determine when the navigation device 600, 1000 is mounted in a vehicle which travels over the road surface features such as speed bumps, uneven or bumpy pieces of road, or holes in the road surface.

In step 1240, the RSQMM 490 stores in the memory 640, 1040 information indicative of the road surface feature type and location information indicating the location of the road surface feature, for each road surface feature. The method ends in step 1250.

Figure 10:
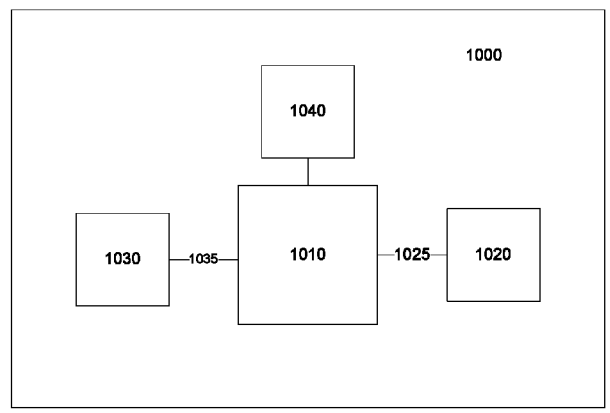
FIG. 10 is a schematic illustration of a navigation device according to another embodiment of the invention.

It will be noted that FIGS. 7, 9 and 10 include representations of outputs of devices present in a vehicle influenced by the front wheels of the vehicle. However, it is expected that a vehicle's rear wheels will also influence the output of measurement devices present in a navigation device in the vehicle. Therefore, the determination of the presence of road surface features in step 1230 will, in some embodiments of the invention, take account of the influence of the rear wheels on the outputs of the measurement devices.

Stored road surface quality information 800 may be utilised by the navigation device 600, 1000 in a route planning process. A user may set in user preferences of the navigation device, or as part of a route planning process, that routes are to be determined which exclude or avoid roads having a low-quality road surface, e.g. those featuring speed bumps. For example, an ambulance or vehicle carrying fragile goods may wish to avoid roads having significant vertical displacements, such as speed bumps, pot-holes etc. During the route planning process, the navigation device 600, 1000 attempts to exclude roads from consideration, or at least to minimise the number of roads included in a determined route, which include vertical displacements such as speed bumps by reference to map data and the road surface quality information 800. In this way, a route is determined using roads having a high-quality i.e. a generally flat road surface.

In some embodiments, the navigation device may communicate the road surface quality information 800 to the server 302, for example either periodically or on-demand from the server 302. The server 302 may then combine road surface quality information from a plurality of navigation devices 600, 1000. Combined road surface quality information 800 is then communicated to navigation devices via the communications channel 318 so that route planning by those navigation devices may take into account road surface quality information derived from the plurality of navigation devices which may cover a wider geographical area and have a greater level of confidence than information determined by a single navigation device 600, 100.

It will be apparent from the foregoing that the teachings of the present invention provide an arrangement whereby features road surfaces are determined by navigation devices rather than by dedicated mapping vehicles. Advantageously, road surface quality information may be used by navigation devices to determine routes which are more pleasing to travel by avoiding, or at least minimising, roads having vertical displacements.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation device, comprising:
   a processor;
   a memory accessible by the processor; and
   a device to measure acceleration of the navigation device and output an acceleration signal indicative of the measured acceleration to the processor,
   the processor being arranged to:
      determine a road-surface feature based upon a magnitude of the acceleration signal;
      determine the type of said road-surface feature based upon a pattern of the acceleration signal; and
      store information indicative of a location and type of the road-surface feature in the memory.

2. The navigation device of claim 1, comprising a device to determine an orientation of the navigation device and output an orientation signal in response thereto.

3. The navigation device of claim 2, wherein the processor is arranged to determine the road-surface feature according to a pattern of the orientation signal.

4. The navigation device of claim 1, wherein the processor is arranged to determine a length of the road surface feature based upon the received information and to store information indicating the length in the memory.

5. The navigation device of claim 1, wherein the processor is arranged to determine the road-surface feature as a vertically-displaced portion of the road surface.

6. The navigation device of claim 1, wherein the type of the road-surface feature is at least one of a speed-reducing measure, a bump and a hole in the road surface.

7. The navigation device of claim 1, wherein the information indicating the location of the road-surface feature is determined according to received GPS signals.

8. The navigation device of claim 1, further comprising:
   a communication device to communicate with a server; wherein
   the processor is arranged to communicate the stored road-surface quality information to the server.

9. A method of determining, by a navigation device, road-surface feature information, the method comprising:
   receiving, from an acceleration measurement device of the navigation device, an acceleration signal indicative of measured acceleration of the navigation device;
   determining a road-surface feature based upon a magnitude of the acceleration signal;
   determining the type of the road-surface feature based upon a pattern of the acceleration signal; and
   storing in a memory information indicative of a geographical location and type of the road-surface feature.

10. A non-transitory computer readable medium to store computer software comprising one or more software modules operable, when executed on a computer device, to perform the method of claim 9.

* * * * *